E. T. HENDEE.
METAL FRICTION CUTTING MACHINE.
APPLICATION FILED OCT. 29, 1913.
1,126,212.
Patented Jan. 26, 1915.
3 SHEETS—SHEET 3.
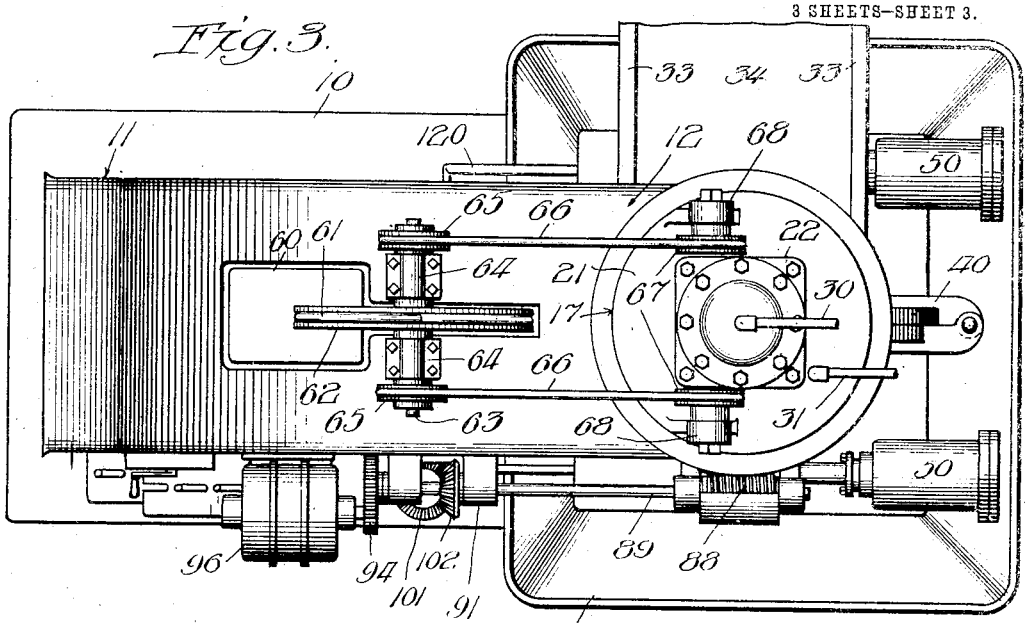
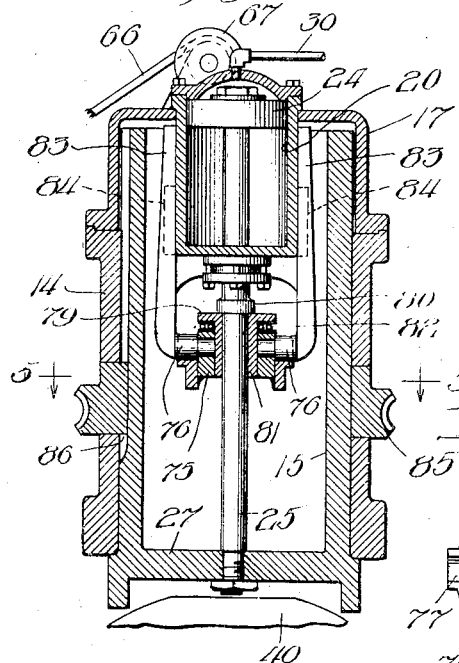
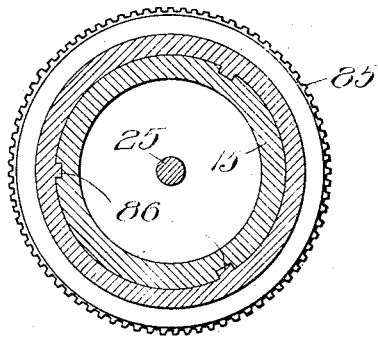
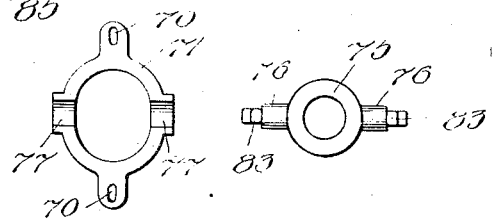
Witnesses:
Harry S. Gaither
G. E. Dowle
Inventor:
Edward T. Hendee
by William H. Hall
Atty

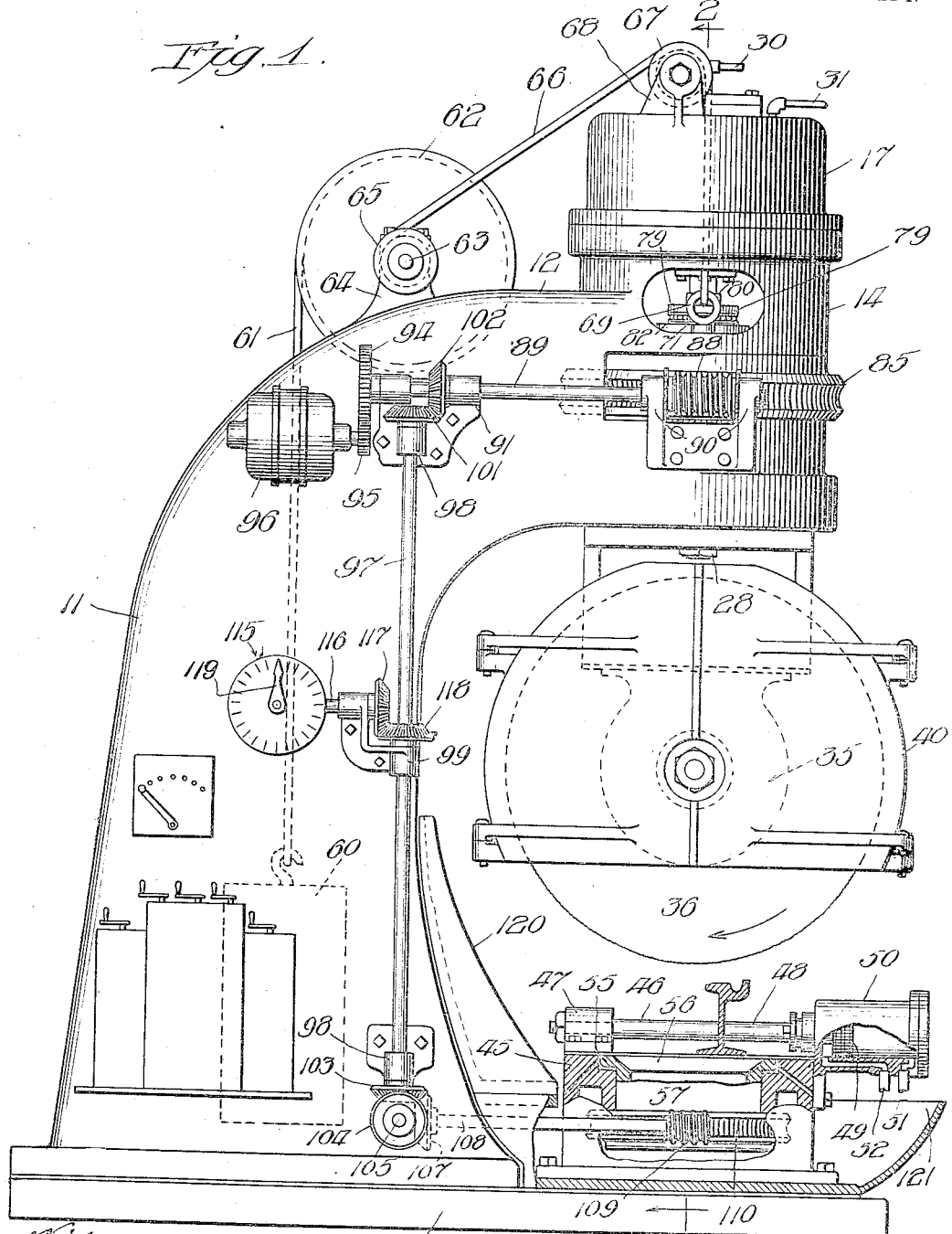

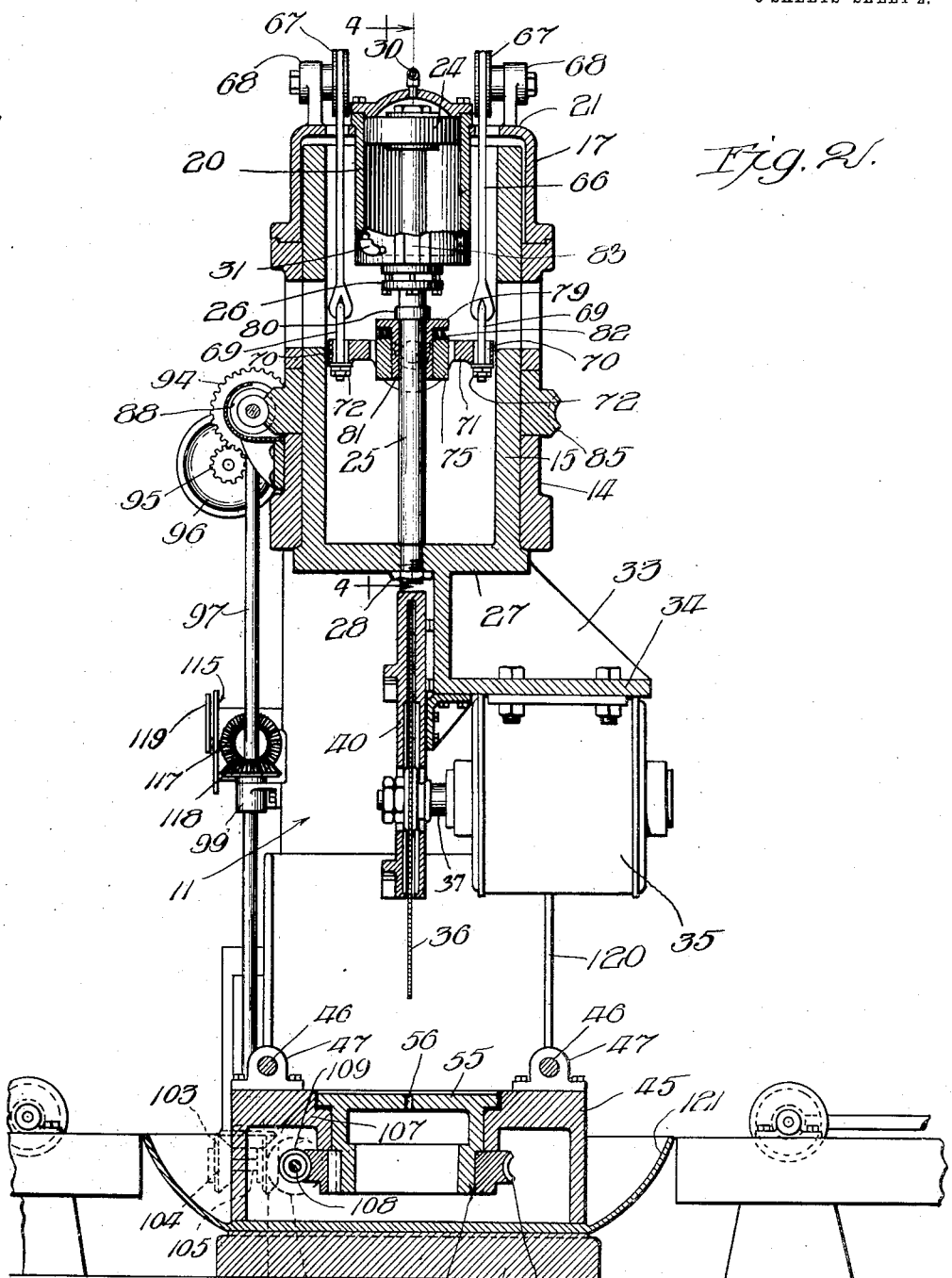

UNITED STATES PATENT OFFICE.

EDWARD T. HENDEE, OF CHICAGO, ILLINOIS.

METAL FRICTION CUTTING MACHINE.

1,126,212. Specification of Letters Patent. Patented Jan. 26, 1915.

Application filed October 29, 1913. Serial No. 797,991.

*To all whom it may concern:*

Be it known that I, EDWARD T. HENDEE, a citizen of the United States, and a resident of Chicago, in the county of Cook and State of Illinois, have invented certain new and useful Improvements in Metal Friction Cutting Machines; and I do hereby declare that the following is a full, clear, and exact description thereof, reference being had to the accompanying drawings, and to the characters of reference marked thereon, which form a part of this specification.

This invention relates to a novel friction cutting machine for rapidly cutting metal plates, bars and shapes by engagement of a high speed cutting disk with the work.

The invention relates more specifically to a machine of this character in which the cutting disk is mounted so as to be movable in a vertical direction toward and from the work supported on the work table and is also adapted to be swung from one side to the other of its central position throughout the whole or greater part of a circle so that thereby the cutting disk may be made to enter the work from the top thereof at varying angles.

Heretofore it has been a common custom in diagonally cutting railroad rails to produce switch tongues, or in diagonally cutting other shapes for like purposes, to use cold saws and to plane the diagonal cuts to properly finish the same for matching purposes. This method of cutting is expensive because of the slow operation of the cold saws, and the subsequent finishing of the diagonally cut surfaces.

It is the purpose of my invention to provide a cutting machine by which diagonal cutting may be rapidly effected, and machine by the use of which the finishing of the cut surfaces may be principally or wholly made unnecessary.

A further object of the invention is to provide a cutting machine wherein the cutting disk may be presented to the work, fixedly held below the disk, at any angle within the full sweep or substantially the full sweep of a circle, and at the same time presenting the cutting edge of the disk in proper direction of rotation to the work.

A further object of the invention is to produce a machine for diagonal cutting in which the tendency of displacement of the work on the work table due to the operation of the cutting disk, is reduced to a minimum.

I have shown in the drawings an approved form of mechanism embodying my invention, but it will be understood that, so far as the broader features of the invention are concerned, the details may be considerably varied. The invention is not, therefore, limited to the structural details shown except as hereinafter made the subject of specific claims and as imposed by the prior art.

In the drawings:—Figure 1 is a side elevation of a friction cutting machine embodying my invention. Fig. 2 is a section on the line 2—2 of Fig. 1. Fig. 3 is a plan view of the machine. Fig. 4 is a section on the line 4—4 of Fig. 2. Fig. 5 is a detail section on the line 5—5 of Fig. 4. Fig. 6 is a detail plan view of a yoke constituting part of the counterbalancing mechanism. Fig. 7 is a plan view of one of the members of the swiveled bearing associated with the counterbalancing mechanism.

As shown in the drawings, 10 designates the base of the machine and 11 a column or standard rising therefrom which is provided with an overhanging arm 12. The overhanging arm 12 is formed at its outer end to constitute a vertical, hollow head 14 within which fits a hollow sliding member 15, hereinafter termed a slide, that guides and controls the cutting disk and its motor, as will hereinafter appear. Said slide is movable vertically in the head and is also adapted to turn or rotate on its axis, the interior of the head being finished to provide a bearing for the slide. Said head 14 is shown as surmounted by a cap or hood 17, detachably fitted thereto, and the upper end of the slide extends into said cap.

20 designates a cylinder that is located centrally within said cap and depends from the top wall 21 thereof. The cylinder is fixedly attached to the cap in any suitable manner, as by means of the flange 22 bolted to the top wall of the cap (Fig. 3). The cylinder is thus fixed to the head from both axial and turning movement.

24 designates a piston within the cylinder, the rod 25 of which extends downwardly therefrom through a stuffing box 26 and said rod is fastened at its lower end to the lower horizontal end wall 27 of the slide 15. As herein shown said piston rod is screw-threaded to the lower end wall of the slide and is locked thereto by the nut 28. The piston and cylinder constitute a motor carried by the frame for positively feeding the saw toward and retracting it from the work. The piston may be either hydraulically or pneumatically actuated by motive medium supplied through pipes 30, 31. Inasmuch as the hydraulic or pneumatic controlling mechanism constitutes *per se* no part of the present invention it is not deemed necessary to illustrate the same.

The lower end of the slide 15 is provided with a laterally turned bracket 33 formed with a downwardly facing portion 34 to which is directly attached a motor 35, said motor being located exterior to the axis of the slide.

36 designates a circular cutting disk which is fixedly attached in any suitable manner to the shaft 37 of the motor, or is otherwise connected to the motor shaft in the manner of a direct connection so that the disk is driven by the motor without the intervention of a driving element, such as a belt. The disk is partially inclosed by a hood 40 which is attached in any suitable manner to the bracket 33, and cooling liquid may be sprayed on the disk within said hood by means not necessary to herein show.

The work table 45 is supported on the base 10 in any suitable or preferred manner, and the work is clamped thereon between fixed horizontal clamping studs 46, 46 and movable clamping studs 48 carried by the table. The fixed clamping studs 46 are fixedly mounted in upstanding brackets 47 at one side of the work table and extend inwardly over and toward the center of the work table. The movable clamping studs constitute the stems of pistons 49 that reciprocate in the cylinders 50 which are supported in any suitable manner on the work table opposite to the brackets 47. The said cylinders 50 are provided with the usual inlet and outlet pipes 51, 52 adapted for connection with water or air under pressure, whereby the clamping studs 48 are hydraulically or pneumatically actuated to force them against the work or move them away from the same. The said work table is provided with a central, rotatively mounted plate 55 which is provided with a clearance slot 56 to receive the cutting disk when in its lowermost position so as to enable the disk to completely sever the work without contact with the table. Said central plate is depressed slightly below the level of the work supporting surface of the table, as shown in the drawings, (Figs. 1 and 2,) so that work which spans the plate does not come in contact therewith. The plate 55 is provided with a depending cylindrical bearing member 57 which rotatively engages a suitable bearing socket in the work table.

The slotted plate 55 of the work table is so connected with the rotative slide 15, as hereinafter described, as to be simultaneously and equally movable therewith in all angular adjustments of the cutting disk so as to insure registration of the clearance slot with the cutting disk when the latter descends to its lowermost position. The said rotating slide and the motor and disk mounting are counterbalanced by a counterbalancing weight 60, the cable 61 of which is attached to and trained over a pulley 62 of relatively large diameter which is fixed to a shaft 63 that is rotatively mounted in bearings 64 carried by the column 11. The said shaft 63 carries at its outer ends pulleys 65, 65 to which are attached and over which are trained cables 66, 66 which extend inwardly over the head 14 of the frame and are, at the top of the head, trained over other pulleys 67, 67 mounted on a shaft which is carried by the brackets 68 that rise from the cap 17. The said cables extend downwardly from the pulleys 67 through openings in the top of the cap 17, and are attached at their lower ends to eye bolts 69 which extend loosely through openings 70 of a yoke 71, which latter has a central opening that surrounds the piston rod 25. The yoke is supported from said eye bolts by nuts 72 screw-threaded to the ends thereof below the yoke.

The yoke carries a swiveling anti-friction bearing by which the motor mounting and the cutting disk are supported, through the piston rod, in such manner as to permit rotation of the slide 15 without tendency of twisting the counterweight cables 66. Said bearing is made as follows: 75 designates a lower bearing member which fits the central opening of the yoke and surrounds the piston rod. It is provided with oppositely extending trunnions 76 which fit in oppositely disposed concave seats 77, 77 in the side members of the yoke, whereby the yoke may rock relatively to said lower bearing member. 79 designates an upper bearing member which bears against a downwardly facing shoulder formed on an enlargement or collar 80 of the piston rod 25. It is provided with a depending tubular portion 81 which extends through the lower bearing and surrounds the piston rod. Between said upper and lower bearing members anti-friction elements 82 are interposed. The lower bearing member 75 is provided with guide arms 83 which engage guide grooves 84, shown as formed on the wall of the cylinder 20, to prevent the lower bearing member and the yoke from turning about the axis of the piston rod. With this construction it will be noted that the slide 15 and the piston rod and its piston attached thereto may rotate without imparting rotative motion to the yoke 71, and, therefore, without tendency to twist the counterbalancing cables 66. Moreover, by reason of the capacity of the yoke to rock, relatively to the axis of the piston rod, an elongation of one of the cables relatively to the other will be self-compensated, to thereby avoid friction between the piston rod and the swiveling anti-friction bearing.

The motor and the directly connected cutting disk are raised and lowered by the admission of a motive fluid into the cylinder 20 in a well known manner, and the counterbalancing mechanism acts on the shouldered piston rod to steady the feeding and retractive movements of the motor and disk.

Referring now to the devices for swinging the cutting disk from side to side so as to vary the angle of the friction disk cut to the plane of the work, the same are made as follows: 85 designates a worm gear which loosely surrounds the rotative slide 15 and is splined thereto by means of the splines or ribs 86 which engage longitudinally disposed grooves or key-ways on the outer face of the slide. This arrangement permits vertical movement of the slide relatively to the worm gear and holds the slide and gear relatively non-rotative. The head 14 of the frame is horizontally slotted or cut away at its side and front and is cored out at its rear to permit the worm gear to extend radially beyond the head. Said worm gear is engaged by a worm 88 which is fixed to a horizontal shaft 89 that is mounted in suitable bearings 90, 91 carried by the frame. The shaft is provided at its rear end with a gear wheel 94 that meshes with a pinion 95 carried by the shaft of a reversible motor 96 which is mounted on the face of the column 11. Thus the cutting disk may be swung in both directions from its central position through a sweep of 360 degrees, so as to cut the work at any desired angle from a plane normal to the work. The said worm and gear disk adjusting mechanism constitutes also means for locking the disk in different angular adjustments.

The means herein shown for connecting the central disk clearance slot plate 55 of the work table to the rotative slide 15 so that the slot 56 is maintained in alinement with the cutting disk in all positions of angular adjustment of the disk, are made as follows. 97 designates a vertical shaft arranged at one side of the common and rotatively mounted in bearings 98, 99 carried by the column. Said shaft is provided at its upper end with a pinion 101 which meshes with a beveled pinion 102 fixed to the worm shaft 89 of the disk adjusting mechanism. The vertical shaft 97 is provided at its lower end with a beveled pinion 103 which meshes with a beveled pinion 104 that is fixed to a short horizontal shaft 105 arranged in rear of the work table. Said shaft 105 is provided at its other end with a beveled pinion 106 which meshes with a beveled pinion 107 that is fixed to the rear end of a shaft 108 which extends at its forward end toward the work table. The shaft 108 is provided with a worm 109 which meshes with a worm gear 110 that is fixed to the depending cylindric bearing member 57 of the angularly adjustable central part 55 of the work table. The ratio of the gearing described is such that the disk clearance slot 56 is moved angularly through the same distance and in the same direction as the cutting disk in all angular adjustments of the latter, and is maintained in such adjustment.

An index or indicator device, designated as a whole by 115, is provided for indicating the angle of the cutting disk and of the clearance slot relatively to the work. It embraces a shaft 116 to which is affixed a beveled pinion 117 that meshes with a pinion 118 on the vertical shaft 97. The said shaft 116 may be associated in any known manner with an index hand 119 which sweeps a graduated dial, as shown in Fig. 2, whereby the angular position of the cutting disk relatively to the work may at all times be observed. The index device is located on the same side of the frame as the index controller, the feed valve, clamping valves and feed roll controllers, as shown in Fig. 1, so that all of said devices may be readily accessible and may be observed from a single position of the operator. Specific reference to these parts, and to the manner of their connection to the motors which they control, is not deemed necessary.

120 designates a spark shield which is arranged between the work table and the base of the column to arrest sparks thrown rearwardly from the disk during the cutting operation. Said spark shield rises upwardly from the rear edge of a catch basin 121 which surrounds the work table to receive the cooling water that falls from the cutting disk and which may be supplied to the disk within the hood in any suitable manner. A suitable drain (not shown) may be, in practice, connected to the basin to drain the water therefrom.

While the machine here shown as organized is designed to feed the disk toward the work, it will be obvious that, so far as certain features of the invention are concerned, the feeding of the work toward the disk will be substantially the same or an equivalent operation.

I claim as my invention:—

1. A metal friction cutting machine comprising a frame, a high speed motor and direct connected friction cutting disk rotatively mounted in the frame to swing through 360 degrees about an axis, means for effecting feeding of the disk toward and from the work and means for swinging or rotating the disk from side to side throughout the full sweep of the disk to vary the angle of the cut to the plane of the work.

2. A metal friction cutting machine comprising a frame, a high speed motor and a direct connected cutting disk, means for feeding the disk vertically toward and from the work, a work table beneath the disk provided with a rotative disk clearance slot plate, and means for angularly adjusting the cutting disk and work table plate in unison.

3. A metal friction cutting machine comprising a frame, a high speed motor and a direct connected cutting disk, means for feeding the disk vertically toward and from the work, a work table beneath the disk provided with a rotative disk clearance slot plate, and means for angularly adjusting the cutting disk and work table plate in unison, said plate being depressed below the plane of the work supporting surface of the work table.

4. A metal friction cutting machine comprising a frame, a high speed motor and direct connected cutting disk, a slide for carrying the motor and disk, said slide arranged above the disk and capable of vertical and rotary movement in the frame, a motor acting on the slide for giving positive vertical movement in both directions to the slide and to the motor and disk, and means for imparting rotative motion to the slide to swing the disk from side to side.

5. A metal friction cutting machine comprising a frame provided with a vertical bearing head, a vertically movable slide mounted in said head and capable of rotative movement therein with means for raising and lowering the slide and for rotating it, and a high speed motor and direct connected cutting disk, said slide being provided with a laterally extending bracket on which the motor is mounted and by which it is carried and said disk and motor being angularly adjustable about the axis of the slide throughout a sweep of 360 degrees.

6. A metal friction cutting machine comprising a frame, a high speed motor and a direct connected cutting disk, means for supporting the motor and disk on the frame, comprising a part which has rotative bearing in the frame about an axis which intersects the axis of rotation of the disk, and capable of vertical movement to feed the disk toward and retract it from the work, and also capable of rotative movement to swing the disk through an angular sweep of at least 270 degrees, and means to impart rotary and vertical movement to the motor and disk supporting means.

7. A metal friction cutting machine comprising a frame, a high speed motor and direct connected cutting disk, a member having rotative and vertical movement in the frame for supporting the motor and cutting disk, means for rotating and for vertically moving the supporting member, a work table below the cutting disk provided with a rotative member having a disk clearance slot therein and means connecting the disk supporting member with said rotative member of the work table, whereby the parts move in unison to thereby maintain the clearance slot in line with the disk.

8. A metal friction cutting machine comprising a frame provided with a head having a vertical bearing, a hollow slide mounted in the vertical bearing and capable of rotative and vertical movement therein, a high speed motor and direct connected cutting disk supported by the slide, a cylinder supported on the head within the slide, a piston within the cylinder provided with a piston rod which is connected to the slide, and means for imparting rotative movement to the slide.

9. A metal friction cutting machine comprising a frame provided with a head having a vertical bearing, a slide mounted in the vertical bearing and capable of rotative and vertical movement therein, a motor and direct connected cutting disk supported by the slide, a cylinder supported on the head, a piston therein provided with a piston rod which is connected to the slide, a worm gear surrounding the slide and splined thereto, whereby the slide may have vertical movement relative to said gear, a worm meshing with the gear and a reversible motor for actuating the worm.

10. A metal friction cutting machine comprising a frame, a high speed motor and a direct connected cutting disk, means for feeding the disk vertically toward and from the work, means for swinging the disk from side to side throughout a complete circle to vary the angle of the cut to the plane of the work, and means for counterbalancing the weight of the cutting disk and motor.

11. A metal friction cutting machine comprising a frame, a high speed motor and direct connected cutting disk, a slide for carrying the motor and disk capable of vertical and rotative movement in the frame, means for giving vertical movement to the slide, means for imparting rotative movement thereto to swing the disk from side to side, and counterbalancing means for the slide, cutting disk and motor comprising a counterweight, cables connected thereto and a swivel bearing between the cables and the slide to avoid twisting of the cables through rotative movement of the slide.

12. A metal friction cutting machine comprising a frame, a high speed motor and direct connected cutting disk, a slide for carrying the motor and disk capable of vertical and rotative movement in the frame, means for giving vertical movement to the slide, means for imparting rotative movement thereto to swing the disk from side to side, and counterbalancing means for the slide, cutting disk and motor comprising a counterweight, cables connected thereto and a connection between said cables and slide, embracing a compensating rocking member to support the weight of the slide, motor and disk, to which the cables are connected.

13. A metal friction cutting machine comprising a frame, a high speed motor and direct connected cutting disk, a slide for carrying the motor and disk capable of vertical and rotative movement in the frame, means for giving vertical movement to the slide, means for imparting rotative movement thereto to swing the disk from side to side, and counterbalancing means for the slide, cutting disk and motor, comprising a counterweight, cables connected thereto and a connection between said cables and slide, embracing a compensating rocking member to support the weight of the slide, motor and disk to which said cables are connected, and an anti-friction swivel bearing between said rocking member and said slide.

14. A metal friction cutting machine comprising a frame, provided with a vertical bearing, a slide mounted therein, and capable of rotative and vertical movement, a high speed motor and direct connected cutting disk supported by the slide, a cylinder supported on the frame, a piston therein provided with a piston rod attached to the slide, and counterbalancing means for the slide, motor and cutting disk embracing a counterweight, cables connected thereto and a member having swiveling connection with the piston rod to which said cables are attached.

15. A metal friction cutting machine comprising a frame provided with a vertical bearing, a slide mounted therein and capable of vertical and rotative movement, a motor and direct connected cutting disk supported by the slide, a cylinder supported on the frame, a piston therein provided with a piston rod attached to the slide, and counterbalancing means for the slide, motor and cutting disk embracing a counterweight, cables operatively connected thereto, a yoke surrounding the piston rod to which the ends of the cables are attached and a swiveling, anti-friction bearing between the yoke and the piston rod.

16. A metal friction cutting machine comprising a frame provided with a vertical bearing, a slide mounted therein and capable of rotative and vertical movement, a motor and direct connected cutting disk supported by the slide, a cylinder supported on the frame, a piston therein provided with a piston rod attached to the slide, and counterbalancing means for the slide, cutting disk and motor embracing a counterweight, cables operatively connected thereto, a yoke surrounding the piston rod to which the ends of the cables are attached and an anti-friction swiveling and thrust bearing device between the yoke and piston rod, said yoke having rocking movement relatively to said bearing, for the purpose set forth.

17. A metal friction cutting machine comprising a frame provided with a vertical bearing, a slide mounted therein and capable of rotative and vertical movement, a motor and direct connected cutting disk supported by the slide, a cylinder supported by the frame, a piston therein provided with a piston rod attached to the slide, and counterbalancing means for the slide, motor and cutting disk embracing a counterweight, cables operatively connected thereto, a yoke surrounding the piston rod to which the ends of the cables are attached and a bearing between the yoke and piston rod comprising a shoulder on the piston rod, an upper bearing member engaged therewith, a lower bearing member provided with trunnions which have rocking bearing with the yoke, and anti-friction elements between said bearing members.

18. A metal friction cutting machine comprising a frame provided with a vertical bearing, a slide mounted therein and capable of rotative and vertical movement, a motor and a direct connected cutting disk supported by the slide, a cylinder supported by the frame, a piston therein provided with the piston rod attached to the slide, and counterbalancing means for the slide, motor and cutting disk embracing a counterweight, cables operatively attached thereto, a yoke surrounding the piston rod to which the ends of the cables are attached and a bearing between the yoke and piston rod comprising a shoulder on the piston rod, an upper bearing member engaged therewith, a lower bearing member provided with trunnions which have rocking bearing in the yoke, anti-friction elements between said bearing members and a non-rotative, endwise slidable connection between said lower bearing member and said cylinder.

19. A metal friction cutting machine comprising a frame, a high speed motor and a direct connected cutting disk, means for feeding the disk vertically toward and from the work, a work table beneath the disk provided with a rotative disk clearance slot plate, means for angularly adjusting the cutting disk and the work table plate in unison, said plate being depressed below the plane of the work supporting surface of the work table, and clamping means for clamping the work on said table comprising fixed studs, and power actuated studs between which and the fixed studs the work is clamped.

20. A metal friction cutting machine comprising a frame having a vertical bearing, a hollow slide mounted in the bearing and capable of rotative and vertical movement therein, a high speed motor and direct connected cutting disk supported directly on the slide, a feed motor within the hollow slide and acting thereon to feed the disk toward and retract it from the work, and means for imparting rotative movement to the slide and disk and for locking the parts in different angular adjustments.

21. A metal friction cutting machine comprising a frame having an overhanging portion at its top formed with a vertical bearing, a slide mounted in the bearing and capable of rotative movement therein through at least 270 degrees and provided below the bearing with a bracket, a high speed motor and direct connected cutting disk below said overhanging portion, with the motor attached to and carried by said bracket, a work support below the disk and means to angularly adjust the slide and to thereby vary the angle of presentation of the disk to the work, with locking means to lock the disk in different angular adjustments.

22. A metal friction cutting machine for cutting rails and beams at right and oblique angles thereto and for also cutting end cuts along lines parallel to the longitudinal axis of the rail, comprising a frame, a slide rotatively mounted therein and capable of being turned 360 degrees about its axis, a friction cutting disk carried by the slide and arranged in the plane of the axis of the slide, a work table provided with a rotative slotted member to receive the disk and a connection between the slotted member and slide which maintains the slot always in position to receive the cutting edge of the disk.

23. A friction cutting machine comprising a frame, a high speed motor and direct connected cutting disk, a mounting therefor in the frame capable of rotative and vertical movement relatively to the frame, means for raising and lowering said mounting and disk and means for rotating said mounting comprising a worm gear surrounding and splined to the mounting to permit the mounting to slide vertically in the gear and a worm screw meshing therewith, with means for rotating the latter.

24. A metal friction cutting machine comprising a frame provided with an elongated vertical bearing of large diameter, a slide having an elongated bearing surface for engagement with said bearing, a high speed motor and direct connected disk carried by the lower end of said slide, said slide being rotatively mounted in said bearing, and a worm and worm wheel mechanism for rotating the slide in its bearing and for locking it in adjusted positions, embracing a worm wheel which is splined to the slide.

25. A metal friction cutting machine comprising a frame having a vertical bearing, a hollow slide mounted in the bearing and capable of rotative and vertical movement therein, a high speed motor and direct connected cutting disk supported on said slide, a motor within the hollow slide to give vertical movement to the slide and disk, means for imparting rotative movement to the slide and disk and counterbalancing means for the slide and disk mounting embracing a cable extending into the hollow slide and attached thereto and traveling over a pulley mounted in said frame.

In testimony, that I claim the foregoing as my invention I affix my signature in the presence of two witnesses, this 18th day of October, A. D. 1913.

EDWARD T. HENDEE.

Witnesses:
   E. M. JANS,
   F. G. GROSSE.